(12) United States Patent
Tanabe et al.

(10) Patent No.: US 6,527,106 B2
(45) Date of Patent: Mar. 4, 2003

(54) ROLLER FOR CHAIN AND CHAIN EQUIPPED WITH THE ROLLER

(75) Inventors: Minoru Tanabe, Osaka (JP);
Katsutoshi Shibayama, Osaka (JP);
Yoshihiro Murakami, Osaka (JP)

(73) Assignee: Tsubakimoto Chain Co., Osaka (JP)

( * ) Notice: Subject to any disclaimer, the term of this patent is extended or adjusted under 35 U.S.C. 154(b) by 53 days.

(21) Appl. No.: 09/826,057

(22) Filed: Apr. 4, 2001

(65) Prior Publication Data
US 2001/0030112 A1 Oct. 18, 2001

(30) Foreign Application Priority Data
Apr. 5, 2000 (JP) .......................... 2000-103582

(51) Int. Cl.[7] .............................................. B65G 17/06
(52) U.S. Cl. .............................. 198/853; 198/845; 59/4; 474/209
(58) Field of Search ...................... 198/779, 851–853, 198/838, 845; 59/4; 474/209, 903; 492/38; 193/37

(56) References Cited

U.S. PATENT DOCUMENTS

| 1,758,280 A | * | 5/1930 | Evans ........................ 193/37 |
| 1,829,973 A | | 11/1931 | Wilkinson |
| 5,378,203 A | * | 1/1995 | Baebel ....................... 474/902 |

FOREIGN PATENT DOCUMENTS

| JP | 62-98615 | 6/1987 |
| JP | 2-31456 | 8/1990 |

* cited by examiner

Primary Examiner—Joseph E. Valenza
(74) Attorney, Agent, or Firm—Howson & Howson

(57) ABSTRACT

A roller adapted to be rotatably mounted on a bushing of each link assembly of a chain comprises a split roller composed of two roller segments assembled together. The split roller can be easily mounted on the bushing from a radial direction of the bushing even though the bushing is integrally formed with links to form a single link assembly. The link assembly has a one-piece structure and hence is improved in strength and rigidity. The bushing of the link assembly is free from damage or break even when the chain is subjected to a great tensile force.

24 Claims, 3 Drawing Sheets

ROLLER FOR CHAIN AND CHAIN EQUIPPED WITH THE ROLLER

BACKGROUND OF THE INVENTION

The present invention relates to a roller fitted around a bushing of a conveyor chain used for conveyance of bottles, cans, precision parts, paper containers, sushi serving plates and so on, or of a chain used for cower transmission, and also to a chain equipped with such roller.

A conveyor chain such as a top chain used for conveyance of sushi serving plates along a circulation path is mainly formed from engineering plastic or stainless steel. According to the structure, the top chain is generally classified into two types; one being of the "roller" type which has a roller mounted on a bushing at the link joint portion of a base chain, and the other being of the "bush" type which has no roller mounted on a bushing (see, Japanese Utility Model Laid-open Publication No. (SHO) 62-98615 and Japanese Utility Model Publication No. (HEI) 2-31456, respectively).

FIG. 3 shows in top plan view a part of the conventional roller type top chain formed from a plastic material. The top chain 31 comprises a crescent-shaped top plate 32 and a base chain 33. FIG. 4 shows a link element of the top chain 31, which is formed by an offset link. As shown in perspective view in FIG. 5, an upper link 34 and an inner bushing tube 35 are formed integrally with each other, and a lower link 36 and an outer bushing tube 37 are formed integrally with each other. The inner bushing tube 35 is fitted in the outer bushing tube 37 so as to form a link assembly 38. The inner and outer bushing tubes 35 and 37 jointly form a bushing portion having a separable structure. When the inner bushing tube 35 is inserted in an axial hole 37A of the outer bushing tube 37, a generally annular locking projection 35A formed on the tip end of the inner bushing tube 35 is snap-fit or otherwise interlocked with an annular recessed portion (not shown) formed continuously with a closed end portion (lower end portion in FIG. 5) of the axial hole 37A. The inner bushing tube 35 has an axial slit 35B extending at least across the locking projection 35A so as to facilitate elastic deformation of the locking projection 35A when the locking projection 35A is forced into the axial hole 37A of the outer bushing tube 37.

In the manufacture of the top chain 31, a roller 40 is rotatably mounted on the outer bushing tube 37, as shown in FIG. 5, before the inner bushing tube 35 is fitted in the outer bushing tube 37 to complete the link assembly 38. The top plate 32 and the link assembly 38 are then connected together by a metallic connector pin 41. A top chain 31 is thus formed. In the top chain 31, the base chain 33 connected with the link assembly 38 constitutes an offset chain. The top plate 32 and the upper link 34 are integrally molded of a synthetic resin. Alternatively, the upper link 34 may be firmly fitted between parallel spaced locking projections (not shown) formed on the undersurface of the top plate 32 in either case, the upper link 34 and the top plate 32 are firmly connected together against separation. In FIGS. 3 to 5, reference characters 32A, 34A and 36A denote pin holes for receiving therein the metallic connector pin 41.

FIG. 6 shows in perspective view a part of the conventional bush type top chain. This top chain is substantially the same as the roller type top chain 31 previously described, with the exception that it does not have a roller. In the bush type ton chain, a link assembly having a bushing portion 39 is connected to a top plate 32 by a connector pin 41. The bushing portion 39 has a separable structure composed of inner and outer bushing tubes assembled together in the same manner as described above. The bushing portion 39 may be formed integrally with upper and lower links 34, 36.

As a conveyor chain, a generally known bush chain is used. The bush chain (not shown) comprises a series of link assemblies each having two inner links connected together by two bushings formed integrally therewith, and a series of sets of outer links arranged alternately with the link assemblies and articulately connected to the link assemblies by means of connector pins extending through the bushings. In one form, each of the link assemblies may be molded from a synthetic resin into an one-piece or unitary structure, and the outer links may be made of metal and disposed on the opposite outer sides of the link assembly so as to form a chain.

In the conventional roller type top chain, the upper link 34 and the lower link 36 are structurally independent from each other, and the bushing portion has a separable structure composed of an inner bushing tube 35 and an outer bushing tube 37. The inner and outer bushing tubes 35, 37 are engaged together merely by an interlocking engagement between the locking projection 35A formed on the tip end of the Inner bushing tube 35 and a recessed portion (not shown) formed continuously with the lower end portion of the axial hole 37A of the outer bushing tube 37. The interlocking engagement between the inner and outer bushing tubes 35, 37 may be released, so that the conventional roller type top chain is inferior in strength and rigidity of the bush portion to a chain having link assemblies each formed of two links connected together by two bushings formed integrally therewith. Accordingly, when the conventional roller type top chain is subjected to a great tensile force, the bushing portion may be damaged, resulting in reduction of the service life of the top chain. Another problem is that when a great tensile force is applied to the top chain, the upper and lower links 34, 36 of each link assembly 38 tend to spread or move apart in vertical direction about the bushing portion 35, 37, and the amount of deformation of the top chain in the vertical direction increases with spreading of the links 34, 36, accordingly. Since the direction of spreading movement of the upper and lower links 34, 36 substantially coincides with the axial direction of the connector pin 41, removal of the connector pin is likely to occur, which may cause accidental disassembly of the top chain.

To deal with the foregoing problems, attempts have been made to form two links and a single bushing integrally with each other to form a single link assembly or to form two links and two bushings integrally with each other to form a single link assembly. However, the link assemblies thus formed make it impossible to mount a roller on the bushing portion.

The conventional bush type top chain is generally used with a sprocket disposed on each corner portion of a circular path of the chain. The sprocket and parts required to install the sprocket make the bush type top chain complicated in construction. Additionally, the bush type top chain requires a larger installation space than the roller type top chain because the roller type top chain can be guided only by horizontal rails without using sprockets. In view of the space requirement, horizontal guide rails disposed at a corner portion may be used with the bush type top chain. However, as opposed to rolling contact achieved between the roller type top chain and the horizontal guide rail, sliding contact achieved between the bush type top chain and the horizontal guide rail creates a greater frictional resistance, and the tensile force acting on the bush type top chain increases accordingly.

SUMMARY OF THE INVENTION

It is an object of the present invention to provide a roller which is capable of being mounted on a link assembly of a strong and rigid one-piece structure composed of two links and one or more bushing members formed integrally with the links.

Another object of the present invention is to provide a chain which is highly resistant against damage even when subjected to a great tensile force, has a roller capable of being mounted on a bushing portion with utmost ease, and can be manufactured with improved efficiency.

In one aspect, the present invention seeks to provide a roller for a chain including a link assembly having two links and a bushing formed integrally with the links, wherein the roller comprises a split roller composed of two roller segments assembled together so that the roller can be rotatably mounted on the bushing from a radial direction of the bushing.

In another aspect the present invention seeks to provide a chain comprising: a number of link assemblies connected by pins, each of the link assemblies having two links and a bushing formed integrally with the links; and a roller rotatably mounted on the bushing of each of the link assemblies, the roller comprising a split roller composed of two roller segments assembled together to mount the bushing rotatably on the bushing from a radial direction of the bushing.

Preferably, the roller segments have an identical configuration.

In one form of the present invention, the roller segments are hinged at one circumferential end thereof and snap-fitted at the other circumferential end thereof.

In another form of the present invention, the roller segments are snap-fitted at opposite circumferential ends thereof.

One end in the circumferential direction of each roller segment is partially removed to form a first stepped portion facing in one direction along the axis the roller, and the other end in the circumferential direction of the same roller segment is partially removed to form a second stepped portion facing in the opposite direction along the axis the roller. The first stepped portion has a locking projection formed thereon, and the second stepped portion has a retaining recess snap-fit with the locking projection on the first stepped portion of another roller segment. Preferably, the opposite ends in the circumferential direction of each roller segment each have a semicircular convex surface extending in the axial direction of the roller, and the first and second stepped portions each have a semicircular concave surface extending in the axial direction of the roller, the semicircular convex surface being complementary in contour to the semicircular concave surface.

As an alternative, each of the roller segments may have straights joint surfaces formed at opposite circumferential ends thereof and extending diametrically across the roller, wherein one end in the circumferential direction of each roller segment has a plug projecting from the joint surface, and the other end in the circumferential direction of the same roller segment has a socket recessed from the joint surface and lockingly receiving therein the plug of another roller segment. Preferably, the plug has two aligned locking projections projecting from opposite surfaces of the plug in the axial direction of the roller, and the socket has two aligned retaining recesses extending in the axial direction of the roller and opening at one end to opposite surfaces of the socket, the retaining recesses being snap-fit with the corresponding locking projections of another roller segment.

The roller comprised of a split roller composed of two roller segments connected together can be mounted on a bushing of a link assembly from a radial outward direction even though the link assembly has a one-piece structure including two links formed integrally with the bushing. This improves the manufacturing efficiency of a chain in which the roller is used. The one-piece link assembly is superior in strength. The roller mounted on the bushing insures rolling contact at a corner portion of a chain circulating path, so that the friction resistance during conveyance is very small. This enables the chain to be applied to a longer conveyor.

BRIEF DESCRIPTION OF THE DRAWINGS

Certain preferred embodiments of the present invention will hereinafter be described in detail, by way of example only, with reference to the accompanying drawings, in which.

DETAILED DESCRIPTION OF THE PREFERRED EMBODIMENTS

The following description is merely exemplary in nature and is in no way intended to limit the invention or its application or uses.

Figure 1:
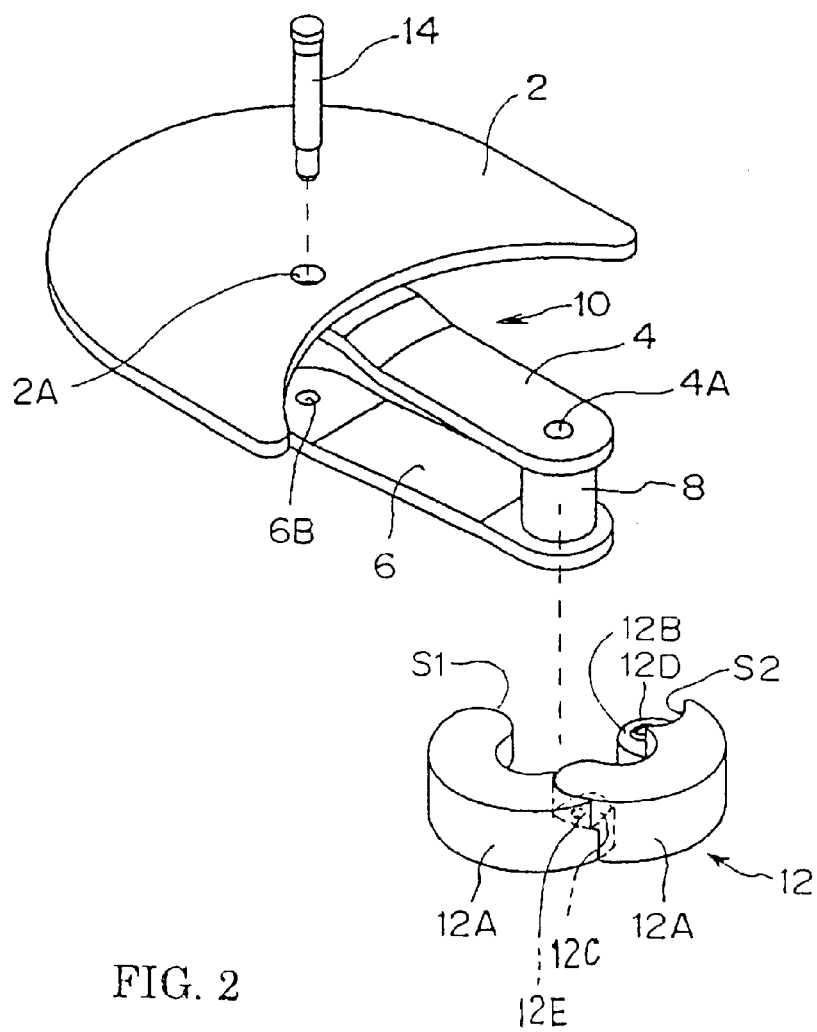
FIG. 1 is a perspective view showing the manner in which a roller is assembled with a link assembly of a top chain according to an embodiment of the present invention.

FIG. 1 shows part of a crescent too chain embodying the present invention. The chain includes a link assembly 10 taking the form of an offset or cranked link. The link assembly 10 has an upper link 4, a lower link 6 and a bushing 8, these parts 4, 6, 8 being integrally molded from a synthetic resin. The link assembly 10 and a crescent-shaped top plate 2 are connected together by a connector pin 14 along the length of the crescent top chain. The top plate 3 is previously made integral with the upper link 4 of the link assembly 10 by means of adhesive bonding or threaded fasteners.

A roller 12 is rotatably mounted on the bushing 8 of the link assembly 10. As shown in FIG. 1, the roller 10 is a split roller composed of two roller halves or segments 12A, 12A of identical configuration assembled or otherwise joined together. The roller segments 12A, 12A are formed from a synthetic resin and have joint surfaces S1, S2 formed at opposite circumferential ends of each roller segment 12A such that a semicircular convex surface S1 of one roller segment 12A contacts a semicircular concave surface S2 of the other roller segment 12A. More specifically, one end in the circumferential direction of each roller segment 12A is partially cut away or removed so as to form a stepped portion 12B facing in one direction along the axis of the roller 12 (upward direction in FIG. 1, for example), and the other end in the circumferential direction of the same roller segment 12A is partially cut away or removed so as to form a stepped portion 12C facing in the opposite direction along the axis of the roller 12 (downward direction in FIG. 1, for example). The stepped portion 12B at one end of the roller segment 12A has a locking projection 12D formed thereon, and the stepped portion 12C at the other end of the same roller segment 12A has a retaining recess 12E formed therein for receiving therein the locking projection 12D in a snap-fit manner. The opposite circumferential ends of each roller segment 12A are rounded to form a semicircular convex surface S1 and the stepped portions 12B, 12C each have a semicircular concave surface S2, the convex and concave surfaces S1, S2 extending in the axial direction of the roller 12.

For assembling the roller 12 with the link assembly 10, the roller segments 12A, 12A are preassembled into a hinged state in which the roller segments 12A, 12A are connected together at one end by way of snap-fitting engagement between the locking projection 12D of one roller segment 12A and the retaining recess 12E of the other roller segment 12A. The hinged roller segments 12A, 12A are then mounted on and around the bushing 8 of the link assembly 10 from a radial outward direction of the bushing 8, and after that the roller segments 12A, 12A are forced together to join the free ends of roller segments 12A, 12A by way of snap-fitting engagement between the retaining recess 12E in the first-mentioned roller segment 12A and the locking projection 12D of the latter-mentioned roller segment 12A.

As an alternative, the roller segments 12A, 12A may be directly mounted on the bushing 8 of the link assembly 10 by forcing them together from diametrically opposite directions perpendicular to the axis of the bushing 8 until the roller segments 12A, 12A are connected together at opposite circumferential ends thereof by way of snap-fitting engagement between the locking projections 12D and the retaining recesses 12E.

Figure 2:
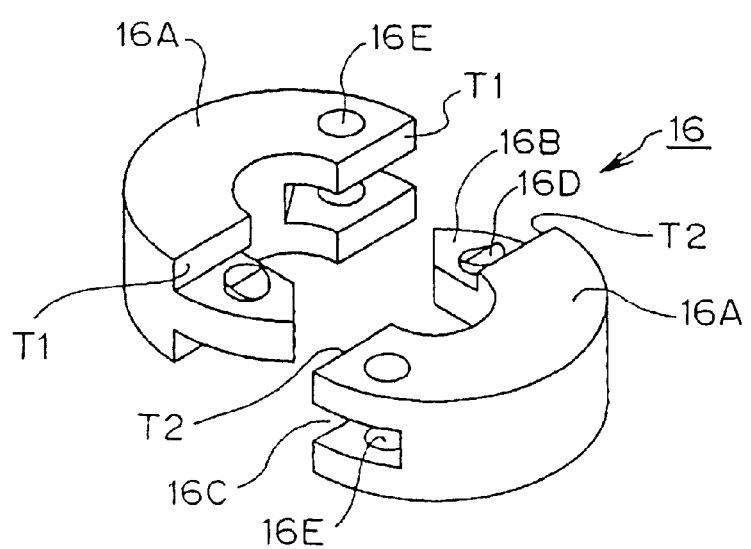
FIG. 2 is an exploded perspective view of a roller according to another embodiment of the present invention.
Figure 3:
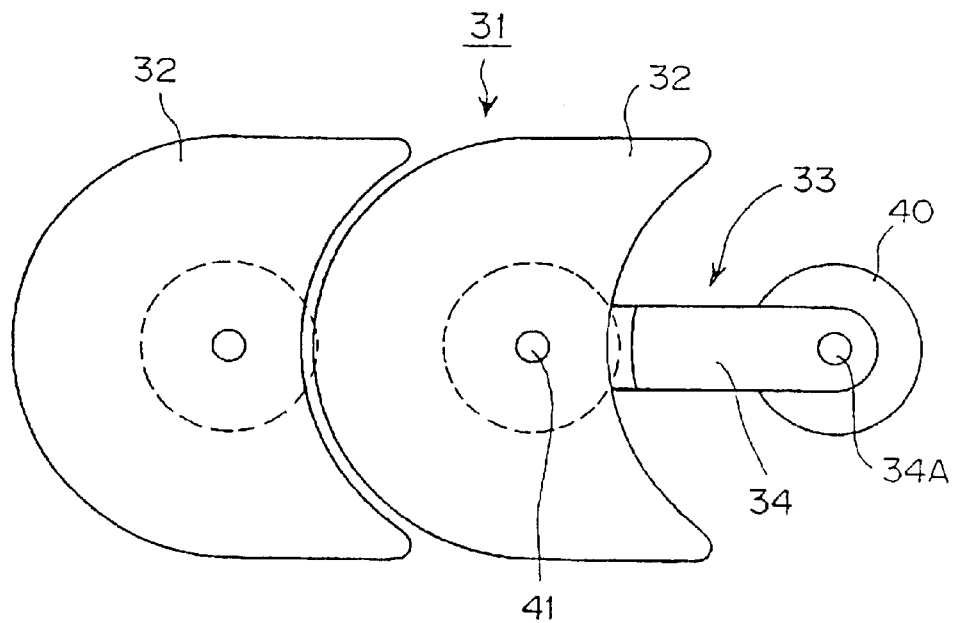
FIG. 3 is a plan view of part of a conventional roller type top chain.
Figure 4:
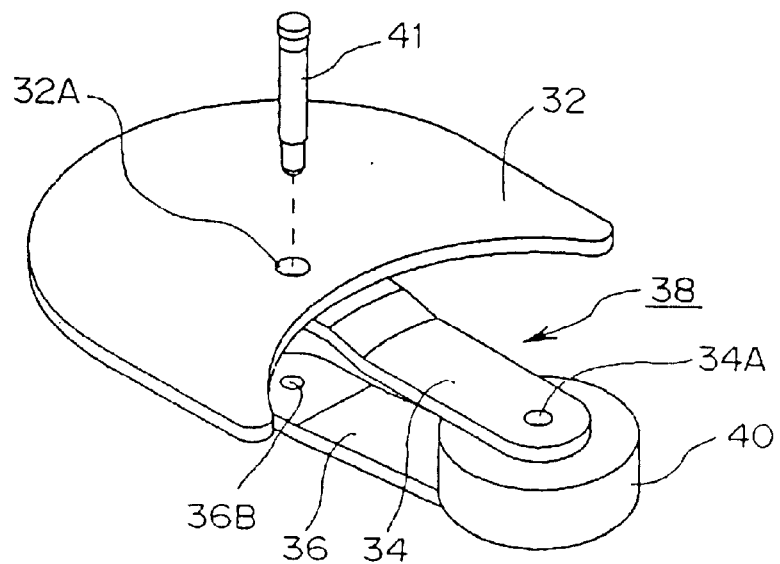
FIG. 4 is a perspective view showing a main portion of a link assembly of the conventional roller type top chain.
Figure 5:
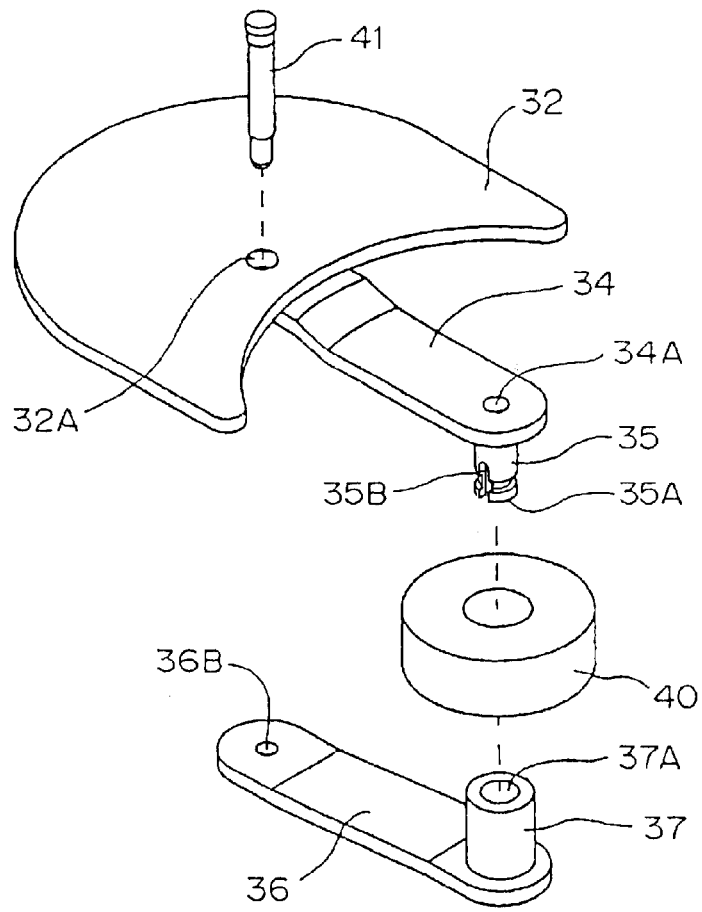
FIG. 5 is an exploded perspective view of the link assembly shown in FIG. 4.
Figure 6:
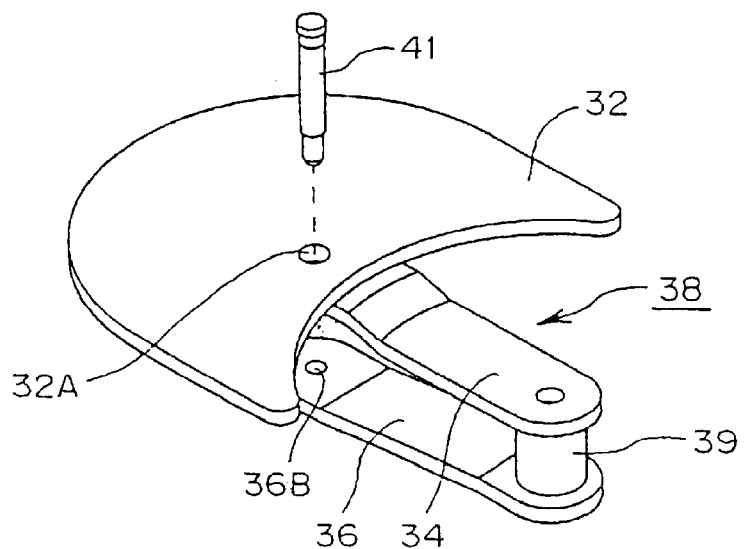
FIG. 6 is a perspective view showing a main portion of a conventional bush type top chain.

FIG. 2 shows a split roller 16 according to another embodiment of the present invention. The split roller 16 is composed of two roller halves or segments 16A, 16A of identical configuration that can be assembled or joined together to mount the roller 16 on a bushing (not shown but identical to the bushing 8 shown in FIG. 1) from a radial outward direction of the bushing. The roller segments 16A, 16A are formed from a synthetic resin and have straight joint surfaces T1, T1; T2, T2 formed at opposite circumferential ends of each roller segment 16A. The straight joint surfaces T1, T2 extend diametrically across the roller 16. One end in the circumferential direction of each roller segment 16A has a plug 16B projecting from the joint surface T1 (T2), and the other end in the circumferential direction of the same roller segment 12A has a socket 16C formed in the joint surface T1 (T2) for lockingly receiving therein the plug 16B of another roller segment 16A. The plug 16B has two aligned locking projections 16D (one being shown) projecting from opposite surfaces of the plug 16B in the axial direction of the roller 16. The socket 16C has two aligned retaining recesses 16E extending in the axial direction of the roller 16 and opening at one end to opposite surfaces of the socket 16C, the retaining recesses 16E being receptive of the corresponding locking projections 16D in a snap-fit manner. In the illustrated embodiment, the retaining recesses 16E comprise axial holes formed in the roller segments 16A, 16a across the sockets 16C, 16C.

When the roller 16 is to be assembled with a link assembly (not shown but identical to the link assembly 10 shown in FIG. 1), the roller segments 16A, 16A are mounted on a bushing 8 (see FIG. 1) of the link assembly from a radial outward direction of the bushing 8 by forcing them together from diametrically opposite directions perpendicular to the axis of the bushing 8 until the plug 16B of ore roller segment 16A is firmly locked in the socket 16C of another roller segment 16A by way of snap-fitting engagement between the locking projections 16D on the plug 16B and the retaining recesses 16E in the socket 16C.

Since the locking projections 16D are formed on opposite surfaces of each plug 16B, the roller segments 16A, 16A connected together have four joint portions formed by and between the locking projections 16D and the retaining recesses 16E. By virtue of the joint portions thus formed, the roller segments 16A, 16B are firmly held together against separation even through the joint portions take the form of snap-fit connections. The roller 16 of the foregoing construction is particularly suitable for use in a top chain because in the top chain, disassembly of the rollers is required very seldom, and the assembling efficiency acquires a higher importance than the disassembling efficiency.

After the roller 12 (or the roller 16) is mounted on the bushing 8 of each link assembly 10, a number of such link assemblies 10 and the associated top plates 2 are connected together by connector pins 14 in an endless fashion to thereby form a crescent top chain. In FIGS. 1 and 2, reference characters 2A, 4A and 6B denote pin holes for receiving therein the connector pin 14.

As described above, the roller 12 or 16 adapted to be rotatably mounted on the bush 8 of the link assembly 10 comprises a split roller composed of two roller segments 12A and 12A or 16A and 16A connected together. Accordingly, even when the link assembly 10 has upper and lower links formed integrally with a bush 8, the split roller 12, 16 can be mounted on the bushing 8 from a radial outward direction of the bushing 8. Since the split roller 12, 16 can be mounted on the bushing 8 either before or after the link assembly 10 is connected to the top plate 2 by a connector pin 14 to form a top chain, the assembling process of the top chain has a higher degree of flexibility. Additionally, by virtue of the identical configuration, the roller segments 12A, 12A; 16A, 16A can be easily mounted on the bushing 8, requires only one mold or the manufacture thereof, and thus reduces the manufacturing cost of the roller.

Because the top chain composed of a series of interconnected link assemblies 10 each having upper and lower links 4, 6 and a bushing 8 molded from a synthetic resin into a unitary structure, the bushing has high strength and rigidity. Accordingly, even when the top chain is subjected to a great tensile force, the bushing is free from damage or breakage and hence can preclude a possible reduction of the service life of the top chain. Additionally, since the roller 12, 16 rotatably mounted on the bushing 8 of each link assembly 10 rollingly contacts horizontal guide rails (not shown) provided at a corner portion of a chain circulating path, the tensile force acting on the chain can be reduced.

In the illustrated embodiments, the roller is a split roller composed of two roller segments of identical configuration. The roller segments may have different configurations provided that they can be mounted on the bushing from a radial outward direction of the bushing. In addition, the roller segments may be connected together by an adhesive or screw fasteners. The roller may be made of engineering plastic, or metal such as stainless steel, aluminum and so on. In brief, the roller should preferably be composed of two roller segments connected together to form a split roller of a circular hollow cylindrical configuration that can be mounted on the bushing from a radial outward direction of the bushing.

The chain equipped with the split rollers may be an offset chain of a top chain, or a roller chair used in a conveyor.

The link assembly composed of two links and a single bushing interconnecting the links at one end may be replaced with another link assembly which is composed of two links and two bushings formed integrally with the links so as to join the links at opposite ends thereof in a like manner as inner links of a roller chain.

The link assembly in the illustrated embodiment is molded from a synthetic resin into a one-piece or unitary structure. As an alternative, a link assembly made of metal such as stainless steel, aluminum and son on can be used provided that two links and one or two bushings are formed integrally with each other. In the latter case, the link assembly may be formed from a sintered alloy or a casting. Additionally, the links and the bushing or bushings may be joined together by welding, adhesive bonding or screw fasteners.

As described above, the roller according to the present invention comprises a split roller composed of two roller segments assembled together. Thus, it is possible to mount the roller on a bushing of a link assembly even when the link assembly has a one-piece or unitary structure in which two links are connected together the bushing. The one-piece link assembly has high strength and rigidity. A chain composed of a plurality of such link assemblies articulately connected together by connector pins has a high strength, and even when the chain is subjected to a large tensile force, the bushings are free from damage or break and the connector pins can be held in position against removal from the chain. Thus, an accidental disassembly of the chain while in use can be avoided.

Even though the chain is formed of highly rigid one-piece link assemblies, the rollers rotatably mounted on the bushings of the link assemblies secures rolling contact during conveyance of an article on a conveyor without requiring a sprocket disposed on a corner portion of a chain circulating path. The conveyor, as a result, is simple in construction. Additionally, even when horizontal guide rails or a corner disc is disposed at a corner portion, the rollers rollingly contact the guide rails or the corner disc and thereby reduces frictional resistance and chain tension during conveyance of the article. The chain according to the present invention can, therefore, convey a greater quantity of articles than the conventional chains and can be used in a longer conveyor than the conventional chain.

Obviously, various minor changes and modifications of the present invention are possible in the light of the above teaching. It is therefore to be understood that within the scope of the appended claims, the present invention may be practiced otherwise than as specifically described.

What is claimed is:

1. A roller for a chain including a link assembly having two links and a bushing formed integrally with the links, said roller comprising: a split roller composed of two roller segments assembled together so that the roller can be rotatably mounted on the bushing from a radial direction of the bushing, wherein, at least one circumferential end of one of the two roller segments has a tongue formed thereon, and at least one circumferential end of the other of said two roller segments has a recess capable of receiving said tongue, the tongue being retained in the recess by a snap fit.

2. The roller according to claim 1, wherein said roller segments have an identical configuration.

3. The roller according to claim 1, wherein said roller segments are hinged at one circumferential end thereof and snap-fitted at the other circumferential end thereof.

4. The roller according to claim 1, wherein said roller segments are snap-fitted at opposite circumferential ends thereof.

5. The roller according to claim 1, wherein one end in the circumferential direction of each roller segment is partially removed to form a first stepped portion facing in one direction along the axis the roller, and the other end in the circumferential direction of the same roller segment is partially removed to form a second stepped portion facing in the opposite direction along the axis the roller, the first stepped portion having a locking projection formed thereon, and the second stepped portion having a retaining recess snap-fit with the locking projection on the first stepped portion of another roller segment.

6. The roller according to claim 5, wherein the opposite ends in the circumferential direction of each roller segment each have a semicircular convex surface extending in the axial direction of the roller, and the first and second stepped portions each have a semicircular concave surface extending in the axial direction of the roller, the semicircular convex surface being complemental in contour to the semicircular concave surface.

7. The roller according to claim 1, wherein the roller segments each have straight joint surfaces formed at opposite circumferential ends thereof and extending diametrically across the roller, said tongue projecting from one of said joint surfaces on one of the roller segments, and said recess being formed in one of said joint surfaces on the other of the roller segments.

8. The roller according to claim 7, wherein the plug has two aligned locking projections projecting from opposite surfaces of the plug in the axial direction of the roller, and the socket has two aligned retaining recesses extending in the axial direction of the roller and opening at one end to opposite surfaces of the socket, the retaining recesses being snap-fit with the corresponding locking projections of another roller segment.

9. A chain comprising:
   a number of link assemblies connected by pins, each of the link assemblies having two links and a bushing formed integrally with the links; and
   a roller rotatably mounted on the bushing of each of the link assemblies, the roller comprising a split roller composed of two roller segments assembled together to mount the roller rotatably on the bushing from a radial direction of the bushing, wherein, at least one circumferential end of one of the two roller segments has a tongue formed thereon, and at least one circumferential end of the other of said two roller segments has a recess capable of receiving said tongue, the tongue being retained in the recess by a snap fit.

10. The chain according to claim 9, wherein said roller segments have an identical configuration.

11. The chain according to claim 9, wherein said roller segments are hinged at one circumferential end thereof and snap-fitted at the other circumferential end thereof.

12. The chain according to claim 9, wherein said roller segments are snap-fitted at opposite circumferential ends thereof.

13. The chain according to claim 9, wherein one end in the circumferential direction of each roller segment is partially removed to form a first stepped portion facing in one direction along the axis the roller, and the other end in the circumferential direction of the same roller segment is partially removed to form a second stepped portion facing in the opposite direction along the axis the roller, the first stepped portion having a locking projection formed thereon, and the second stepped portion having a retaining recess snap-fit with the locking projection on the first stepped portion of another roller segment.

14. The chain according to claim 13, wherein the opposite ends in the circumferential direction of each roller segment each have a semicircular convex surface extending in the axial direction of the roller, and the first and second stepped portions each have a semicircular concave surface extending in the axial direction of the roller, the semicircular convex surface being complemental in contour to the semicircular concave surface.

15. The chain according to claim 9, wherein the roller segments each have straight joint surfaces formed at opposite circumferential ends thereof and extending diametrically across the roller, said tongue projecting from one of said joint surfaces on one of the roller segments, and said recess being formed in one of said joint surfaces on the other of the roller segments.

16. The chain according to claim 15, wherein the plug has two aligned locking projections projecting from opposite surfaces of the plug in the axial direction of the roller, and the socket has two aligned retaining recesses extending in the axial direction of the roller and opening at one end to opposite surfaces of the socket, the retaining recesses being snap-fit with the corresponding locking projections of another roller segment.

17. A roller according to claim 1, wherein the tongue extends in a circumferential direction from said one circumferential end, said tongue having at least one locking projection extending therefrom in a direction transverse to said circumferential direction, and said recess extends into said at least one circumferential end of the other of said two roller segments, and has an inner wall with a retaining recess extending into said inner wall in a direction transverse to said circumferential direction, and wherein said locking projection is sufficiently short in said transverse direction that the tongue, with said locking projection extending therefrom, can be pressed into the tongue-receiving recess and the locking projection engaged with, and fitted into, the retaining recess, during assembly, by movement of said one of the two roller segments in a direction in a radial plane relative to the other roller segment, said tongue being in engagement with said wall and said locking projection fitting into said retaining recess.

18. A roller according to claim 17, wherein said locking projection and said retaining recess both extend in a direction parallel to the axis of said roller.

19. A chain according to claim 9, wherein the tongue extends in a circumferential direction from said one circumferential end, said tongue having at least one locking projection extending therefrom in a direction transverse to said circumferential direction, and said recess extends circumferentially into said at least one circumferential end of the other of said two roller segments, and has an inner wall with a retaining recess extending into said inner wall in a direction transverse to said circumferential direction, and wherein said locking projection is sufficiently short in said transverse direction that the tongue, with said locking projection extending therefrom, can be pressed into the tongue-receiving recess, and the locking projection engaged with, and fitted into, the retaining recess, during assembly, by movement of said one of the two roller segments in a direction in a radial plane relative to the other roller segment, said tongue being in engagement with said wall and said locking projection fitting into said retaining recess.

20. A chain according to claim 19, wherein said locking projection and said retaining recess both extend in a direction parallel to the axis of said roller.

21. A roller according to claim 1, wherein the tongue extends in a circumferential direction from said one circumferential end, said tongue having a pair of locking projections extending therefrom in opposite directions, both said opposite directions being transverse to said circumferential direction, and said recess extends circumferentially into said at least one circumferential end of the other of said two roller segments, and has a pair of opposed inner walls, a retaining recess extending into each of said inner walls, said retaining recesses also extending in directions transverse to said circumferential direction, and wherein said locking projections are sufficiently short in said opposite directions that the tongue, with said locking projections extending therefrom, can be pressed into the recess and the locking projections engaged with, and fitted into, the respective retaining recesses, during assembly, by movement of said one of the two roller segments in a direction in a radial plane relative to the other roller segment, said tongue being in engagement with said walls and said locking projections fitting into the respective retaining recesses.

22. A roller according to claim 21, wherein said locking projections and said retaining recesses extend in directions parallel to the axis of said roller.

23. A chain according to claim 9, wherein the tongue extends in a circumferential direction from said one circumferential end, said tongue having a pair of locking projections extending therefrom in opposite directions, both said opposite directions being transverse to said circumferential direction, and said recess extends circumferentially into said at least one circumferential end of the other of said two roller segments, and has a pair of opposed inner walls, a retaining recess extending into each of said inner walls, said retaining recesses also extending in directions transverse to said circumferential direction, and wherein said locking projections are sufficiently short in said opposite directions that the tongue, with said locking projections extending therefrom, can be pressed into the recess and the locking projections engaged with, and fitted into, the respective retaining recesses, during assembly, by movement of said one of the two roller segments in a direction in a radial plane relative to the other roller segment, said tongue being in engagement with said walls and said locking projections fitting into the respective retaining recesses.

24. A chain according to claim 23, wherein said locking projections and said retaining recesses extend in directions parallel to the axis of said roller.

* * * * *